United States Patent Office 3,150,178
Patented Sept. 22, 1964

3,150,178
PROCESS FOR THE MANUFACTURE OF BENZENE-SULFONYL-UREA DERIVATIVES
Walter Aumüller and Karl Muth, both of Kelkheim, Taunus, Germany, assignors to Farbwerke Hoechst Aktiengesellschaft vormals Meister Lucius & Brüning, Frankfurt am Main, Germany, a corporation of Germany
No Drawing. Filed Apr. 26, 1962, Ser. No. 190,228
Claims priority, application Germany, May 12, 1961, F 33,910; June 27, 1961, F 34,280; Mar. 10, 1962, F 36,246
1 Claim. (Cl. 260—553)

It is known that certain benzenesulfonyl-urea derivatives show hypoglycemic properties and are suitable as antidiabetics that can be orally administered. Above all, the N - (4 - methylbenzenesulfonyl)-N'-n-butyl-urea has gained great importance in the therapy of diabetes because of its good activity and its being well tolerated. Various processes are known for preparing the benzenesulfonyl-urea derivatives in question. In addition to the hydrolysis of corresponding benzenesulfonyl-isourea ethers or the desulfurization of corresponding benzenesulfonyl-thioureas, for example, the most important manufacturing processes are based, in principle, on reacting benzenesulfonyl-isocyanates or derivatives of such compounds, for instance benzenesulfonyl-urethanes, with alkylamines or on reacting, in a reverse manner, alkyl-isocyanates or their corresponding derivatives such as alkyl-ureas and the like, with benzene-sulfonamides.

The preparation of N-benzenesulfonyl-N'-alkyl-ureas by reaction of unsubstituted N-benzenesulfonyl-ureas with alkyl-halides has, hitherto, not yet been disclosed, nor are analogous N-benzenesulfonyl-N'-aryl-ureas accessible in that way. A direct acylation of unsubstituted benzenesulfonyl-ureas at the nitrogen atom opposite to the benzenesulfonyl-radical is known, but this acylation only proceeds under special conditions in the presence of Lewis acids as catalysts.

The present invention relates to the preparation of benzenesulfonyl-urea derivatives of the general formula

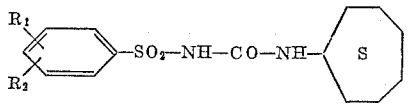

wherein $R_1$ and $R_2$ each are hydrogen, halogen atoms or alkyl or alkoxy groups having 1 to 6 carbon atoms and —if $R_2$ stands for hydrogen—$R_1$ may also represent the trifluoromethyl group or an acyl radical $R_3$—CO— in which $R_3$ represents an alkyl group having from 1 to 6 carbon atoms, a phenyl radical or a tolyl radical. Said benzenesulfonyl-urea derivatives are obtained in good yields by reacting benzenesulfonyl-ureas of the formula

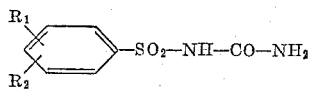

in which $R_1$ and $R_2$ have the meanings given above, with water-soluble tropylium salts and hydrogenating in the cycloheptatrienyl radical the N-benzenesulfonyl-N'-cycloheptatrienyl-urea derivatives obtained and corresponding to the general formula

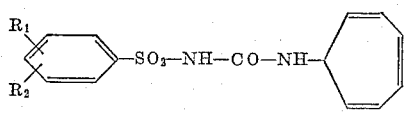

in which $R_1$ and $R_2$ have the meanings given above.

Tropylium salts are known from literature. For the preparation of tropylium salts the cycloheptatriene which nowadays is technically accessible represents an appropriate starting material. For the process of the invention there are used, in particular, tropylium halides such as tropylium bromide and tropylium chloride.

For the reaction with water-soluble tropylium salts benzenesulfonyl-urea derivatives of the above-mentioned formula unsubstituted at the side of the urea molecule opposite to the sulfonyl group are used as starting substances. The substituents $R_1$ and $R_2$, on their part, may represent an alkyl radical having from 1 to 6 carbon atoms, for instance, methyl, ethyl, n-propyl, isopropyl, n-butyl, isobutyl, sec. butyl, tert. butyl, n-amyl, iso-amyl and n-hexyl and the corresponding isomers or likewise an alkoxy radical having from 1 to 6 carbon atoms, for instance a methoxy, ethoxy, n-propoxy, isopropoxy, n-butoxy, isobutoxy, amyloxy and hexoxy radical. These radicals may be of straight chain or branched. Furthermore, the substituents $R_1$ and $R_2$ may likewise represent a halogen atom such as fluorine, chlorine, bromine and iodine. The radicals may be in any desired positions of the benzene nucleus, but, particularly in the presence of only one substituent, the para-position and then the meta-position are preferred. If the benzene nucleus is substituted twice, dihalogen, dialkyl and dialkoxy radicals enter into consideration, but the substituents from these groups may also be mixed so that alkyl-alkoxy-benzene radicals, alkyl-halogen-benzene radicals and alkoxy-halogen-benzene radicals may be present. Finally, there can likewise be used phenyl radicals substituted by the trifluoro-methyl group or monoacylated phenyl radicals; in such a case $R_3$ may stand, e.g., for methyl, ethyl, propyl, isopropyl as well as phenyl or tolyl. Therefore, the following compounds enter into consideration as starting substances for the process of the present invention:

Benzenesulfonyl-urea, 4 - methyl-benzenesulfonyl-urea, 4-ethyl-benzenesulfonyl-urea, 4-n-propyl-benzenesulfonyl-urea, 4-isopropyl-benzenesulfonyl-urea, 4-n-butyl-benzenesulfonyl-urea, 4-isobutyl-benzenesulfonyl-urea, 4-methoxy-benzenesulfonyl-urea, 4-ethoxy-benzenesulfonyl-urea, 4-n-propoxy-benzenesulfonyl-urea, 4-isopropoxy-benzenesulfonyl-urea, 4-n-butoxy-benzenesulfonyl-urea, 4-isobutoxy-benzenesulfonyl-urea, 4-fluoro-benzenesulfonyl-urea, 4-chloro-benzenesulfonyl-urea, 4 - bromo-benzenesulfonyl-urea, 4-iodo-benzenesulfonyl-urea, 4-trifluoromethyl-benzenesulfonyl-urea, acetophenonesulfonyl-urea, and benzophenone-sulfonyl-urea.

Instead of compounds substituted in 4-position in the benzene nucleus there may likewise be used the corresponding benzenesulfonyl-ureas substituted in 2-position and, especially in 3-position. As already mentioned above, the benzenesulfonyl-ureas may likewise contain two equal or various radicals of those mentioned above.

The reaction is carried out in the presence of acid binding agents such as alkali metal carbonates and alkali metal bicarbonates. The benzenesulfonyl-ureas used as starting substances may likewise be used in the form of the corresponding salts. As acid binding agents there are likewise suitable nitrogen containing organic bases such as pyridine or triethylamine. It is of advantage to operate in an aqueous medium, but aqueous-organic solvents, for instance mixtures of dimethylformamide and water, acetone and water or pure organic solvents, for instance pyridine, may also be used. As reaction temperatures, there are applied, above all, temperatures of about 20° C. It is, however, likewise possible to carry out the reaction with cooling and at a moderately elevated temperature. The various methods of operation of the process of the present invention are elucidated in detail by the examples.

The N-benzenesulfonyl-N'-cycloheptatrienyl-urea derivatives obtained in the first stage of the reaction are remarkably pure. If necessary, they may be further purified by recrystallization from alcohols or alcohol/water mixtures and other suitable solvents.

The hydrogenation in the second stage of the reaction into the corresponding N-benzenesulfonyl-N'-cycloheptyl-urea derivatives is advantageously carried out in alcoholic solution, in the case of hardly soluble compounds in the presence of dimethyl-formamide. It is, however, likewise possible to directly hydrogenate the alkali metal salts of the benzenesulfonyl-cycloheptatrienyl-ureas dissolved in water. As catalysts there can generally be used those applied for the hydrogenation of olefinic double bonds, for instance palladium or platinum.

The smooth and distinct course of the reaction could not be foreseen when considering the state of the art.

Furthermore, the possibility could not be excluded that due to the operation in aqueous solution and in the presence of alkaline agents considerable side reactions would occur, for instance, the formation of ditropyl ethers. There likewise existed the possibility that another cycloheptatrienyl residue was introduced.

In contradistinction thereto, the desired N-benzene-sulfonyl-N'-cycloheptatrienyl-urea derivatives are obtained according to the process of the present invention with the aid of tropylium halides in remarkably pure, crystalline form and in good yields.

It is, for instance, possible to obtain in excellent yield the N - (4 - methyl - benzenesulfonyl) - N' - cycloheptatrienyl-urea by simply adding dropwise at room temperature an aqueous solution of the sodium salt of N-(4-methyl-benzenesulfonyl)-urea to an aqueous tropylium-bromide solution and to produce thereof the N-(4-methyl-benzenesulfonyl)-N'-cycloheptyl-urea in nearly quantitative yield likewise in a smooth reaction by catalytic hydrogenation that can be carried out without difficulties; the product immediately separates in crystalline form.

The process according to the invention leads to the corresponding N - benzenesulfonyl - N'-cycloheptyl-ureas showing the known high hypoglycemic effect. For instance, the N-(4-methyl-benzenesulfonyl)-N'-cycloheptyl-urea, while being well tolerated, shows an excellent blood sugar lowering activity superior to that of the known N-(4-methyl-benzenesulfonyl)-N'-n-butyl-urea. The process according to the invention allows of preparing in a simple and technically advanced manner likewise N-benzenesulfonyl-N'-cycloheptyl-urea derivatives containing substituents sensitive to catalytic hydrogenation. The disadvantageous preparation of the cycloheptylamine necessary as starting substance in the known processes and accessible only with difficulties, is dispensed with. The preparation of the desired benzenesulfonyl-urea derivatives on a direct way is possible by starting from simple starting products easily accessible in industry when the process according to the present invention is applied.

The products obtained according to the process of the present invention are preferably destined for the preparation of compositions showing hypoglycemic action and capable of being orally administered in the treatment of diabetes mellitus. They can be applied as such or in the form of their salts or in the presence of substances causing salt formation. For the salt formation there can be used, for example, alkaline agents such as alkali metal hydroxides, alkaline earth metal hydroxides, alkali metal carbonates, alkaline earth metal carbonates, alkali metal bicarbonates and alkaline earth metal bicarbonates.

The following examples illustrate the invention:

EXAMPLE 1

*N-(4-Methyl-Benzenesulfonyl)-N'-Cycloheptyl-Urea*

($a_1$) To a solution of 4.28 grams of p-toluene-sulfonyl-urea in 20 milliliters of dimethyl-formamide there is added a filtered solution of 3.42 grams of tropylium bromide in 4 milliliters of water. To this mixture of solutions there are added with stirring 2.86 grams of sodium carbonate taken up in 2 milliliters of water ($Na_2CO_3.10H_2O$). A crystalline precipitate is obtained which is filtered with suction after having been stirred for a further 30 minutes and diluted by means of 40 milliliters of water. It is then washed with water and recrystallized from methanol. The yield in N-(4-methylbenzenesulfonyl)-N'-cycloheptatrienylurea amounts to 3.4 grams (66% of the theoretical yield). The decomposition point amounts to 139–141° C.

($a_2$) 12 grams of p-toluene-sulfonyl-urea are taken up in 56 milliliters of dimethyl-formamide and a solution of 6.44 grams of tropylium chloride in 10.2 milliliters of water is added. To the solution are added dropwise while stirring, 7.3 grams of sodium carbonate taken up in 5.1 milliliters of water ($Na_2CO_3.10H_2O$). When the reaction is terminated, the solution shows a neutral reaction. A crystalline precipitate of N-(4-methyl-benzenesulfonyl)-N'-cycloheptatrienyl-urea is obtained which is filtered off with suction, dried on clay and recrystallized from methanol. The yield in crude product amounts to 15.8 grams (91% of the theoretical yield), the point of decomposition of the pure substance amounts to about 139–141° C.

($a_3$) To a solution of 3.76 grams of tropylium bromide in 220 cc. of water there is added dropwise a solution of 4.28 grams of p-toluene-sulfonyl-urea in 200 milliliters of water and 10 milliliters of 2 N-sodium-hydroxide solution. A crystalline precipitate is obtained which, after having been additionally stirred for 30 minutes, is filtered with suction, washed out and dried on clay. The quantity of dry N-(4-methyl-benzenesulfonyl)-N'-cycloheptatrienyl-urea obtained amounts to 4.8 grams. For its further purification according to Example 1$a_1$ the substance is recrystallized from methanol.

($a_4$) 4.28 grams of p-toluenesulfonyl-urea are dissolved in 30 cc. of dimethyl-formamide and 3.76 grams of tropylium bromide are dissolved in 200 cc. of water. 10 cc. of 2 N-sodium hydroxide solution are added to the tropylium-bromide solution. A slight turbidity is observed. The two solutions are united while being stirred. The forming precipitate of N-(4-methyl-benzenesulfonyl)-N'-cycloheptatrienyl-urea is filtered off with suction and taken up in an ammonia solution of about 1% strength in order to be further purified. The solution is filtered and dilute hydrochloric acid is added to the filtrate. The N - (4 - methyl-benzenesulfonyl) - N' - cycloheptatrienyl-urea obtained in a yield of 3.8 grams is recrystallized from methanol as described in Example 1$a_1$.

(*b*) *Hydrogenation.*—1.85 grams of N-(4-methyl-benzenesulfonyl)-N'-cycloheptatrienyl-urea are dissolved in 200 milliliters of absolute methanol and 30 milliliters of dimethyl-formamide. After addition of palladium black, the solution is shaken with hydrogen at room temperature under atmospheric pressure in a duck-shaped vessel. After 10 minutes the reaction mixture has taken up 455 milliliters of hydrogen (the calculated consumption of hydrogen amounts to about 440 milliliters). The catalyst is eliminated by filtration, the solution is concentrated under reduced pressure at 30–35° C. and the N-(4-methyl-benzenesulfonyl)-N'-cycloheptyl-urea obtained is precipitated from the concentrated solution by cautious addition of water. The compound is filtered off with suction and dried. The melting point amounts to 154–156° C. Yield: 1.55 grams (84% of the theoretical yield). After recrystallization from methanol the substance melts at 155–157° C.

EXAMPLE 2

*N-(4-Methoxy-Benzenesulfonyl)-N'-Cycloheptyl-Urea*

(*a*) To a solution of 3.76 grams of tropylium bromide in 200 milliliters of water a solution of 4.6 grams of 4-methoxy-benzenesulfonyl-urea in 200 milliliters of water and 10 milliliters of 2 N-sodium hydroxide solution is dropwise added. The precipitate separating during the dropping in is filtered off with suction after having been additionally stirred for 30 minutes and is dried on clay. The yield amounts to 5.9 grams. The N-(4-methoxybenzenesulfonyl)-N'-cycloheptatrienyl-urea, after recrystallization from ethanol, melts at 144–145° C. (decomposition).

(b) 3.2 grams of the crude product obtained as described sub (a) are dissolved in 300 milliliters of methanol and after addition of palladium black shaken with hydrogen at room temperature and under atmospheric pressure in a duck-shaped shaking vessel. After terminated absorption of hydrogen, the mixture is filtered and the filtrate is concentrated to one-quarter of its volume. By cautiously adding water there are obtained crystals of N-(4-methoxybenzenesulfonyl)-N'-cycloheptyl-urea in a yield of 2.4 grams (74% of the theoretical yield). After recrystallization from ethanol the compound melts at 160–162° C.

EXAMPLE 3

N-(3,4-Dimethyl-Benzenesulfonyl)-N'-Cycloheptyl-Urea (a) To a solution of 3.76 grams of tropylium bromide in 200 milliliters fo water there is added, while stirring, a solution of 4.5 grams of 3,4-dimethyl-benzenesulfonyl-urea in 200 milliliters of water and 10 milliliters of 2 N-sodium hydroxide solution. The crystalline precipitate obtained is filtered off with suction, washed with water and dried on clay. There are obtained 5.3 grams of N-(3,4 - dimethyl-benzenesulfonyl) - N' - cycloheptatrienyl-urea (83% of the theory). After having been recrystallized from ethanol, the compound melts at 136–137° C. (decomposition).

(b) 3.18 grams of the crude product obtained as described sub (a) are dissolved in 200 milliliters of methanol and, after addition of palladium as catalyst, hydrogenated with hydrogen at room temperature under atmospheric pressure in a duck-shaped shaking vessel. When the absorption of hydrogen is terminated, the mixture is filtered, the filtrate is concentrated to one quarter of its volume and water is cautiously added. The crystals constituting N-(3,4-dimethyl-benzenesulfonyl)-N'-cycloheptyl-urea after recrystallization from ethanol melt at 166–168° C. The crude product is obtained in a yield of 2.7 grams (83% of the theoretical yield) and melts at 165–167° C.

EXAMPLE 4

N-Benzenesulfonyl-N'-Cycloheptyl-Urea (a) 4 grams of benzenesulfonyl-urea are dissolved in 200 milliliters of water and 10 milliliters of 2 N-sodium hydroxide solution. The solution obtained is dropwise added to a solution of 3.7 grams of tropylium bromide in 200 milliliters of water. The precipitate obtained is filtered off with suction and dried on clay. There are obtained 3.8 grams of N-benzenesulfonyl-N'-cycloheptatrienyl-urea which after having been recrystallized from ethanol melts at 139–140° C. with decomposition.

(b) 2.78 grams of the crude product obtained as described sub (a) are dissolved in 200 milliliters of methanol. The hydrogenation is carried out as described above. When the absorption of hydrogen is terminated, the mixture is concentrated under reduced pressure and water is cautiously added. There are obtained 2.5 grams of N-benzenesulfonyl-N'-cycloheptyl-urea of a melting point of 172–174° C. (88% of the theory). After recrystallization from ethanol the substance melts at 174–175° C.

EXAMPLE 5

N-(4-Chloro-Benzenesulfonyl)-N'-Cycloheptyl-Urea (a) 4.7 grams of N-(4-chloro-benzenesulfonyl)-urea are dissolved in 200 cc. of water and 10 cc. of 2 N-sodium hydroxide solution. While being stirred at room temperature, this solution is dropped into a solution of 3.76 grams of tropylium bromide in 200 cc. of water. Already after a short time the precipitation of crystals sets in. They are filtered off with suction, washed with water and dried on clay. The crude N-(4-chloro-benzenesulfonyl)-N'-cycloheptatrienyl-urea is obtained in a yield of 5.6 grams (86% of the theory). For purification, the product is taken up in aqueous ammonia solution of 1% strength, filtered with charcoal and the filtrate is acidified by means of hydrochloric acid. The pure N-(4-chloro-benzenesulfonyl) - N' - cycloheptatrienyl-urea obtained melts at 159–160° C. with decomposition and adopts a black coloration.

(b) 2 grams of the N-(4-chloro-benzenesulfonyl)-N'-cycloheptatrienyl-urea are dissolved in 150 cc. of methanol with addition of 30 cc. of dimethyl-formamide. After addition of palladium black the mixture is shaken with hydrogen at room temperature under atmospheric pressure in a duck-shaped vessel. Thus 390 cc. of hydrogen are absorbed (calculated: 420 cc.). The catalyst is filtered off, the mixture is cautiously concentrated under reduced pressure and water is dropwise added to the concentrated solution. A crystalline product of N-(4-chloro-benzenesulfonyl)-N'-cycloheptyl-urea is obtained which is filtered off with suction and dried. The yield amounts to 1.4 grams; melting point 163–165° C. After recrystallization from ethanol the compound melts at 166–168° C.

EXAMPLE 6

N-(4-Acetyl-Benzenesulfonyl)-N'-Cycloheptyl-Urea (a) 24.2 grams of 4-acetyl-benzenesulfonyl-urea are dissolved in 400 milliliters of water and 50 milliliters of 2 N-sodium hydroxide solution. This solution is slowly dropped, while being stirred at room temperature, into a solution of 18.8 grams of tropylium bromide in 200 milliliters of water. The separated crystalline precipitate is sucked off after having been stirred additionally for 30 minutes, and dissolved in aqueous ammonia solution of 1% strength. It is filtered by means of charcoal. The filtrate is cautiously acidified by means of dilute acetic acid whereby a crystalline precipitate of N-(4-acetyl-benzenesulfonyl) - N'-cycloheptatrienyl-urea is obtained in nearly quantitative yield. After recrystallization from ethanol the substance melts at 151–152° C. with decomposition.

(b) 16.5 grams of N-(4-acetyl-benzenesulfonyl)-N'-cycloheptatrienyl-urea are dissolved in 150 milliliters of methanol and 150 milliliters of dimethyl-formamide. After addition of palladium black the reaction mixture is shaken with hydrogen at room temperature in a duck-shaped vessel. After the substance has taken up the calculated amount of hydrogen, it is filtered from the catalyst, concentrated under reduced pressure and water is cautiously added to the concentrated solution. There is obtained in nearly quantitative yield a crystallisate of N-(4-acetyl-benzenesulfonyl)-N'-cycloheptyl-urea which after recrystallization from ethanol melts at 176–178° C.

EXAMPLE 7

(a) N - (benzophenone - 4 - sulfonyl)-N'-cycloheptyl-urea.—30.4 grams of benzophenone-4-sulfonyl-urea are dissolved in 400 milliliters of water and 50 milliliters of 2 N-sodium hydroxide solution. While stirring there is added to this solution at room temperature a solution of 18.8 grams of tropylium bromide in 200 milliliters of water. Already during the dropping in the N-(benzophenone - 4-sulfonyl)-N'-cycloheptatrienyl-urea that has formed crystallizes out. The substance obtained in a very good yield after having been dissolved in ammonia solution of 1% strength and reprecipitated by means of hydrochloric acid, is recrystallized from ethanol. The melting point amounts to 155–156° C. (with decomposition).

(b) In a manner analogous to that described in Example 1b the N-(benzophenone-4-sulfonyl)-N'-cycloheptatrienyl-urea is subjected to catalytic hydrogenation.

There is obtained in nearly quantitative yield the N-(benzophenone - 4 - sulfonyl)-N'-cycloheptyl-urea which after recrystallization from ethanol melts at 189–191° C.

EXAMPLE 8

(a) *N - (4-trifluoromethyl-benzenesulfonyl)-N'-cycloheptatrienyl-urea.*—26.1 grams of 4-trifluoromethyl-benzenesulfonyl-urea are dissolved with 4.6 grams of sodium hydroxide in 115 cc. of water and diluted with a further 900 cc. of water. A solution of 18 grams of tropylium bromide in 700 cc. of water is dropwise added. During the dropping in care is to be taken that a weakly basic medium (pH 8) is permanently maintained; in case of need a further quantity of sodium hydroxide solution has to be added. The reaction mixture is additionally stirred for 1 hour and acidified by means of acetic acid, filtered off with suction and recrystallized from alcohol. The N - (4 - trifluoromethyl - benzenesulfonyl)-N'-cycloheptatrienyl-urea melts at 158–159° C. (with decomposition).

(b) *N - (4-trifluoromethyl-benzenesulfonyl)-N'-cycloheptyl-urea.*—16.4 grams of N-(4-trifluoromethyl-benzenesulfonyl)-N'-cycloheptatrienyl-urea are dissolved in 400 cc. of absolute methanol and 60 cc. of dimethyl-formamide. After addition of palladium black the reaction mixture is shaken with hydrogen at room temperature in a duck-shaped vessel. The absorption of hydrogen is terminated after 1 hour. The catalyst is filtered off, the substance is concentrated and the N-(4-trifluoromethyl-benzenesulfonyl)-N'-cycloheptyl-urea is precipitated by addition of water. Melting point: 154° C. (after recrystallization from alcohol).

EXAMPLE 9

(a) *N - (3-trifluoromethyl-benzenesulfonyl)-N'-cycloheptatrienyl-urea.*—23.5 grams of 3-trifluoromethyl-benzenesulfonyl-urea are dissolved with 4.15 grams of sodium hydroxide and 100 cc. of water. The solution is diluted to a total volume of 900 cc. A solution of 16.4 grams of tropylium-bromide in 600 cc. of water is dropwise added, the reaction mixture being maintained at about pH 8. It is stirred for one further hour, the reaction mixture is acidified by means of dilute acetic acid, the precipitate is filtered off with suction and crystallized from a mixture of alcohol and water. There is obtained the N - (3-trifluoromethyl-benzenesulfonyl)-N'-cycloheptatrienyl-urea that melts at 93° C.

(b) *N - (3-trifluoromethyl-benzenesulfonyl)-N'-cycloheptyl-urea.*—10 grams of N-(3-trifluoromethyl-benzenesulfonyl) - N' - cycloheptatrienyl-urea are hydrogenated with palladium in 200 cc. of methanol with addition of 200 cc. of dimethyl-formamide. When the absorption of hydrogen is terminated, the substance is worked up in the usual manner. There is obtained the N-(3-trifluoromethyl-benzenesulfonyl)-N'-cycloheptyl-urea of a melting point of 106° C. (after recrystallization from a mixture of alcohol and water).

We claim:

The process of preparing benzenesulfonyl-urea derivatives of the formula

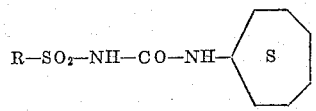

in which R is a member selected from the group consisting of radicals of the formulae

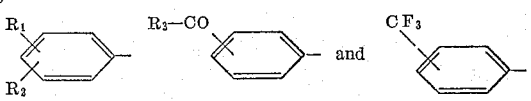

wherein $R_1$ and $R_2$ are members selected from the group consisting of hydrogen, halogen, and alkyl and alkoxy having at most six carbon atoms; $R_3$ is a member selected from the group consisting of alkyl having at most six carbon atoms, phenyl and tolyl, which comprises adding a water-soluble tropylium salt, in the presence of an acid binding agent, to a benzenesulfonyl-urea of the formula R—SO$_2$—NH—CO—NH$_2$, in which R has the above identified meaning, and catalytically hydrogenating the cycloheptatrienyl residue in the N-benzene-sulfonyl-N'-cycloheptatrienyl urea of the formula

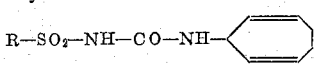

thus obtained.

References Cited in the file of this patent

Doering et al.: J. Am. Chem. Soc., vol. 79, pages 352–356 (1957).

Fieser and Fieser: Advanced Organic Chem., pages 909–911 (1961).